United States Patent
Paxinos et al.

(10) Patent No.: US 9,854,003 B2
(45) Date of Patent: Dec. 26, 2017

(54) SYSTEM AND METHOD FOR INITIATING TELECOMMUNICATIONS SESSIONS THROUGH AN ELECTRONIC MAIL ADDRESS

(71) Applicant: netTALK.com, Inc., North Miami, FL (US)

(72) Inventors: Garry M Paxinos, Pompano Beach, FL (US); Anastasios Kyriakides, Hollywood, FL (US); Kenneth A. Hosfeld, Coral Springs, FL (US); Anastasios Nicholas Kyriakides, II, Plantation, FL (US); Oscar Aparicio, Pembroke Pines, FL (US); Prashant Mehta, Pembroke Pines, FL (US); William Escudero, Miami, FL (US); Daniel Delgado, Miami, FL (US); Marcelo Gabriel Matews, Boca Raton, FL (US); Alain Gonzalez, Miami, FL (US)

( * ) Notice: Subject to any disclaimer, the term of this patent is extended or adjusted under 35 U.S.C. 154(b) by 194 days.

(21) Appl. No.: 14/722,097

(22) Filed: May 26, 2015

(65) Prior Publication Data
US 2015/0341393 A1 Nov. 26, 2015

Related U.S. Application Data

(60) Provisional application No. 62/002,835, filed on May 24, 2014.

(51) Int. Cl.
*G06F 15/16* (2006.01)
*H04L 29/06* (2006.01)
(Continued)

(52) U.S. Cl.
CPC .... *H04L 65/1006* (2013.01); *G06F 17/30876* (2013.01); *H04L 51/28* (2013.01); *H04L 65/103* (2013.01); *H04L 65/1069* (2013.01)

(58) Field of Classification Search
CPC .. H04L 51/28; H04L 65/1006; H04L 65/1069
See application file for complete search history.

(56) References Cited

U.S. PATENT DOCUMENTS

| 2007/0243870 A1* | 10/2007 | Bantukul | H04L 67/16 |
| | | | 455/435.1 |
| 2009/0005038 A1* | 1/2009 | Yasrebi | H04L 65/4038 |
| | | | 455/435.1 |

(Continued)

*Primary Examiner* — Bryan Lee
(74) *Attorney, Agent, or Firm* — The Keys Law Firm, PLLC

(57) ABSTRACT

A system and method of establishing and controlling a telecommunications or multimedia communications sessions over a conventional call signaling protocol is employed to enable such a communications session to the initiated and managed between participants through translated resource identifiers. The method of establishing and controlling a telecommunications or multimedia communications sessions over a conventional call signaling protocol is employed in one embodiment through the provision of a database which includes resource records linked together by user which include an email address and corresponding URIs, the retrieval of a corresponding URI upon the generation of a session invitation which identifies its target recipient by email address, the transmitting of the session invitation to the retrieved URI, and notifying the target recipient by sending a message to the email address used to generate the session invitation.

5 Claims, 2 Drawing Sheets

(51) Int. Cl.
*G06F 17/30* (2006.01)
*H04L 12/58* (2006.01)

(56) References Cited

U.S. PATENT DOCUMENTS

| 2009/0132632 A1* | 5/2009 | Jackson | H04L 12/5885 |
| | | | 709/201 |
| 2010/0112985 A1* | 5/2010 | Gavita | H04L 61/106 |
| | | | 455/414.1 |
| 2010/0172344 A1* | 7/2010 | Yin | H04L 63/029 |
| | | | 370/352 |

* cited by examiner

SYSTEM AND METHOD FOR INITIATING TELECOMMUNICATIONS SESSIONS THROUGH AN ELECTRONIC MAIL ADDRESS

CROSS REFERENCE TO RELATED APPLICATIONS

This application claims the benefit of and incorporates by reference U.S. provisional patent application Ser. No. 62/002,835 filed May 24, 2014.

BACKGROUND OF THE INVENTION

Field of the Invention

This invention relates generally to network communication sessions and, more particularly, to a system and method for establishing and controlling a voice communication session through a token or identifier such as an electronic mail address.

Description of the Prior Art

The provisioning of telephonic communications services (voice, fax, or data) over computer networks, such as the Internet, is well established. Various call signaling protocols, such as Session Initiation Protocol ("SIP"), H.323, and MGCP are commonly used in Voice over Internet Protocol ("VoIP") systems to control multimedia communications sessions, including voice and video calls. This includes the use of various uniform resource identifiers ("URI") to initiate and establish such communications sessions between communications devices of a plurality of participants. A problem which still exists, however, is that existing call signaling protocols lack the ability to establish and control telecommunications sessions, such as voice communication sessions, between participants identified by a token or identifier such as a conventional electronic mail ("email") addresses. Thus, there remains a need for a system and method for establishing and otherwise controlling telecommunications sessions using a token or identifier such as an email address to establish the connection between the parties.

The Applicant's invention described herein provides for a system and method for initiating telecommunications sessions with participants identified by a token or identifier, such as an email address. When in operation, the system and method enables a user to initiate a voice communications session with a target user by generating a call request directed at the target user's email address. advertisements relevant to a user's conversations or media heard (and/or viewed) in real time. As a result, many of the limitations imposed by prior art systems are removed.

SUMMARY OF THE INVENTION

A system and method of establishing and controlling a telecommunications or multimedia communications sessions over a conventional call signaling protocol is employed to enable such a communications session to the initiated and managed between participants through translated resource identifiers. The method of establishing and controlling a telecommunications or multimedia communications sessions over a conventional call signaling protocol is employed in one embodiment through the provision of a database which includes resource records linked together by user which include an email address and corresponding URIs, the retrieval of a corresponding URI upon the generation of a session invitation which identifies its target recipient by email address, the transmitting of the session invitation to the retrieved URI, and notifying the target recipient by sending a message to the email address used to generate the session invitation.

It is an object of this invention to provide a system and method for establishing and otherwise controlling telecommunications sessions using a token or identifier such as an email address to establish the connection between the parties.

This and other objects will be apparent to one of skill in the art.

DETAILED DESCRIPTION OF THE INVENTION

Figure 1:
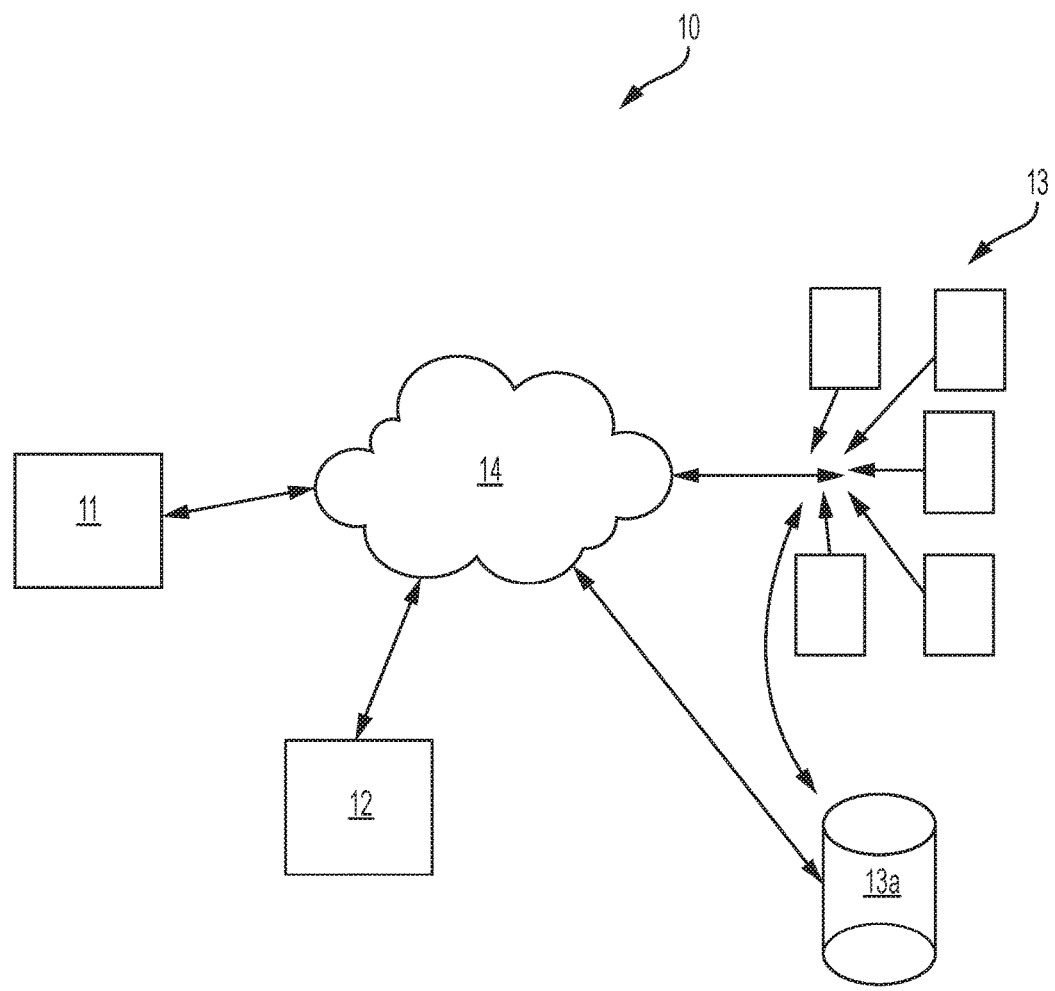
FIG. 1 shows the components of a system for initiating telecommunications sessions with participants identified by an email address built in accordance with the present invention.

Referring now to the drawings and in particular FIG. 1, a system 10 for establishing and controlling telecommunications sessions with participants identified by a token or resource identifier such as email address is shown having a first communications device 11, a second communications device 12, a plurality of service provider servers ("servers") 13, and a translation database 13a. Each component is shown connected to a computer network, such as the Internet 14, enabling the transmission of data there between. The first communications device 11 and second communications device 12 are each conventional communications devices which include a audio input and output and an interface for entry of data, such as telephones (including mobile phones), computers (including mobile computers), set top boxes, and the like. Collectively, the servers 13 embody the communications equipment of conventional VoIP service providers as well as of public switched telephone network and mobile network phone service providers. In this regard, the system 10 for initiating telecommunications sessions with participants identified by an email address is similar to conventional telecommunications systems. The system 10 for initiating telecommunications sessions with participants identified by an email address additionally includes the database 13a, defined as a relational database in the preferred embodiment, which includes records linked together by user which include an email address and a URI, such as a SIP address. In addition, at least one of the first communications device 11 and the second communications device 12 is configured to receive data entry embodied as an email address, enabling it to send call requests which are directed at a specific email address as opposed to a conventional URI. It is contemplated that the first communications device 11 and the second communications device 12 can be configured in such a way through the inclusion of a conventional keyboard or number pad, or by being connected to another device from which it can receive a target email addresses. Further at least one of the servers 13 are modified as discussed below to enable it contact the translation database 13a and translate an email address to a corresponding URI and translate a corresponding URI to an email address. It is contemplated that the database 13a may be housed in a distinct location from the one or more of the servers 13 and accessed either directly or through the Internet 14, or may be embodied in one or more of the servers 13 and accessed by other servers either directly or through the Internet 14.

Figure 2:
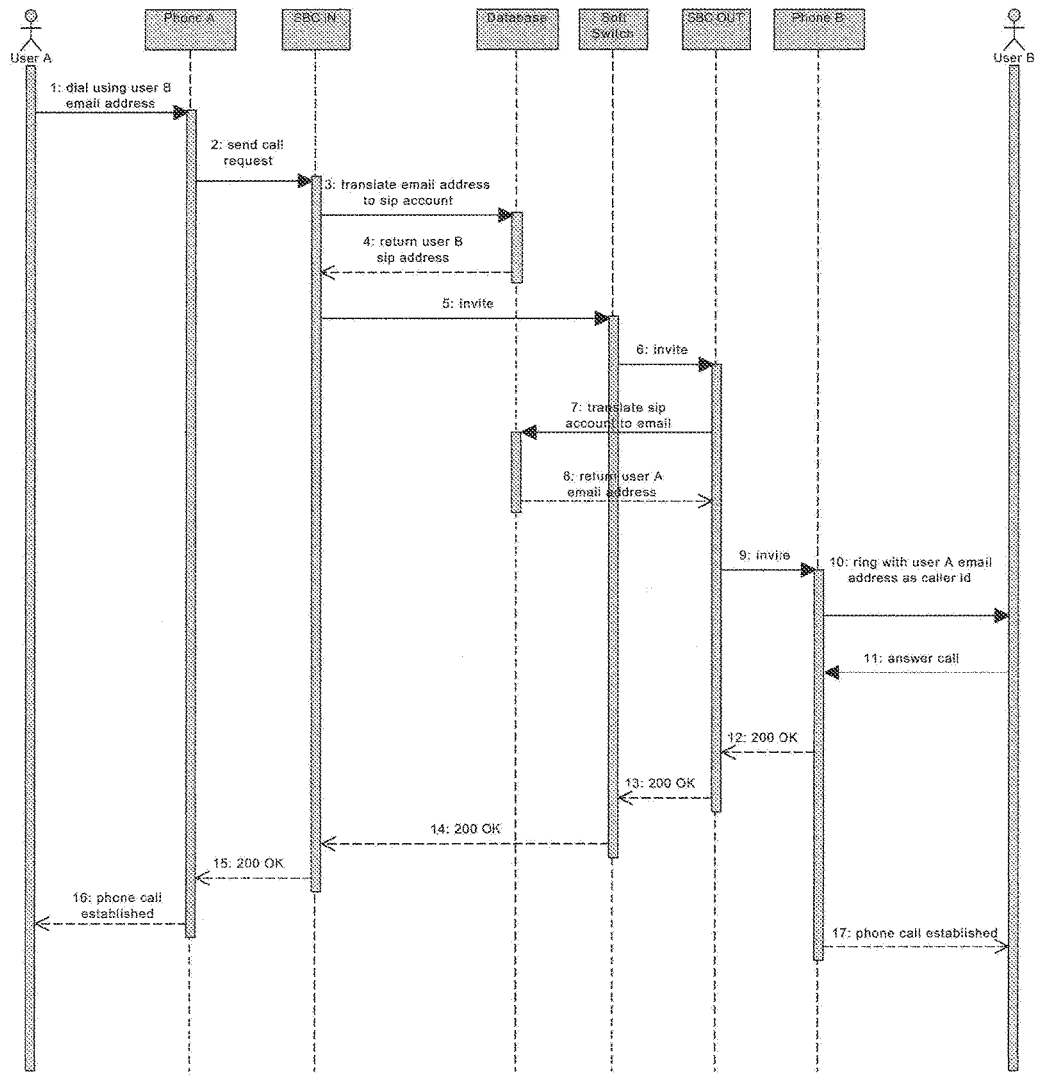
FIG. 2 illustrates the steps through which a telephonic communications session is initiated over a computer network through a call request embodied as an email address.

Referring now to FIG. 2, the method of establishing and controlling telecommunications sessions with participants identified by an email address in a SIP based implementation begins with a first user, User A, dialing or otherwise entering on a communications device, Phone A, an email address of Phone B, the communications device of a second user, User B, that the target contact. Once the dialing is complete, Phone A transmits a call request to a first gateway of Phone A's telecommunications service provider, defined in the preferred embodiment as a first session border controller. The first session border controller receives the call request and identifies that it contains an email address, which prompts it to connect to the translation database. The first session border controller then retrieves from the database the conventional URI which corresponds to the email address in the call request. In the preferred embodiment, the conventional URI retrieved is a SIP account.

Once the SIP account is retrieved by the first session border controller, it transmits an invite to the softswitch for routing and connecting to the retrieved SIP account. The softswitch the passes the invite to a second gateway, defined in the preferred embodiment as a second session border controller. The second session border controller then receives the invite and identifies that it includes a translated SIP account, which prompts it to connect to the translation database. The second session border controller then retrieves from the database the email address which corresponds to the SIP account in the invite and transmits the invite as an email to the target email address.

It is appreciated that call requests containing email addresses may be generated externally, with the second session border controller simply receiving the invite and identifying that it includes a translated SIP account, which prompts it to connect to the translation database to retrieve the email address which corresponds to the SIP account in the invite and transmit the invite as an email to the target email address.

When the invite email sent, it causes Phone B to ring. When User B opens the email and answers the invite, by selecting an option in the email in the preferred embodiment, Phone B transmits to the second session border controller that the call has been answered and connected. This signal is then passed from the second session border controller to the softswitch, to the first session border controller and then to Phone A. When the signal is received by Phone A, the phone call is established, with the control thereof remaining in control of the session border controller(s).

It is contemplated that the present invention can be practiced with other tokens or identifiers used to direct the call request to the target recipient instead of an email address identifier. In such alternate embodiments, the token may be embodied as any character string which can identify a unique user and which can be linked to that user's URI (such as a SIP account or other character string which designates a destination number, such as a phone number) in the translation database in a manner which enables the gateway to retrieve the target URI.

It is additionally contemplated that in other call signaling protocols, other gateways and URIs may be employed.

It is further contemplated that the first session border controller and second session border controller in the described embodiment, or more generally the first gateway and second gateway, may be embodied in multiple, distinct servers or groups of servers or in a single server or group of servers.

It is understood that the use of the phase telephonic communications sessions is meant to any telecommunications services employed for the purpose of electronic transmission of voice, fax, or data between distant parties.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of establishing and controlling a telecommunications session over at least one communications protocol for signaling and controlling multimedia communication session, comprising the steps of:

providing a database in which a plurality of email addresses are each associated with a uniform resource identifier, wherein each of said uniform resource identifiers identifies a predefined telecommunications resource on the communications protocol for signaling and controlling multimedia communication session;

receiving at a first communications gateway a command from a first communications device to initiate a target telecommunication session with a second communications device, wherein said command includes a target email address for the second communications device and the first communications device and the second communications device are each one of said predefined telecommunications resources on the communications protocol for signaling and controlling multimedia communication session;

upon the first communications gateway identifying that the command includes the target email address, retrieving by said first communications gateway the uniform resource identifier associated with the target email address through information from the database;

transmitting by said first communications gateway a target invite to the retrieved uniform resource identifier for routing to the second communications device for the target telecommunication session;

receiving by a second communications gateway the target invite for the retrieved uniform resource identifier;

upon the second communications gateway recognizing that the retrieved uniform resource identifier in the target invite was retrieved from the database, retrieving by the second communications gateway the target email associated with the retrieved uniform resource identifier through information from the database;

notifying by the second communications gateway the second communications device about the target telecommunications session by transmitting to the target email the target invite; and upon the second communications device answering the target invite, notifying the first communications device that the second communications device has answered the target invite so as to establish the target telecommunications session.

2. The method of establishing and controlling a telecommunications session of claim 1, wherein the command includes an originator email address that is associated with the uniform resource identifier which identifies the first communications device.

3. The method of establishing and controlling a telecommunications session of claim 2, additionally comprising the step of retrieving by said second communications gateway the originator email address that is associated with the uniform resource identifier which identifies the first communications device through information from the database.

4. The method of establishing and controlling a telecommunications session of claim 3, wherein the communications protocol for signaling and controlling multimedia communication session defines a Session Initiation Protocol, the first communications gateway and communications gateway each define a session border controller, and each of the uniform resource identifiers defines a Session Initiation Protocol account address.

5. The method of establishing and controlling a telecommunications session of claim 1, wherein the notification of the first communications device that the second communications device has answered the target invite includes sending a notification signal from the second communications device, through at least the second communications gateway and first communications gateway, to the first communications device.

* * * * *